May 26, 1959     J. SUNNEN     2,887,768
AUTOMOTIVE WRIST PIN TOOL
Filed Aug. 31, 1955     2 Sheets-Sheet 2
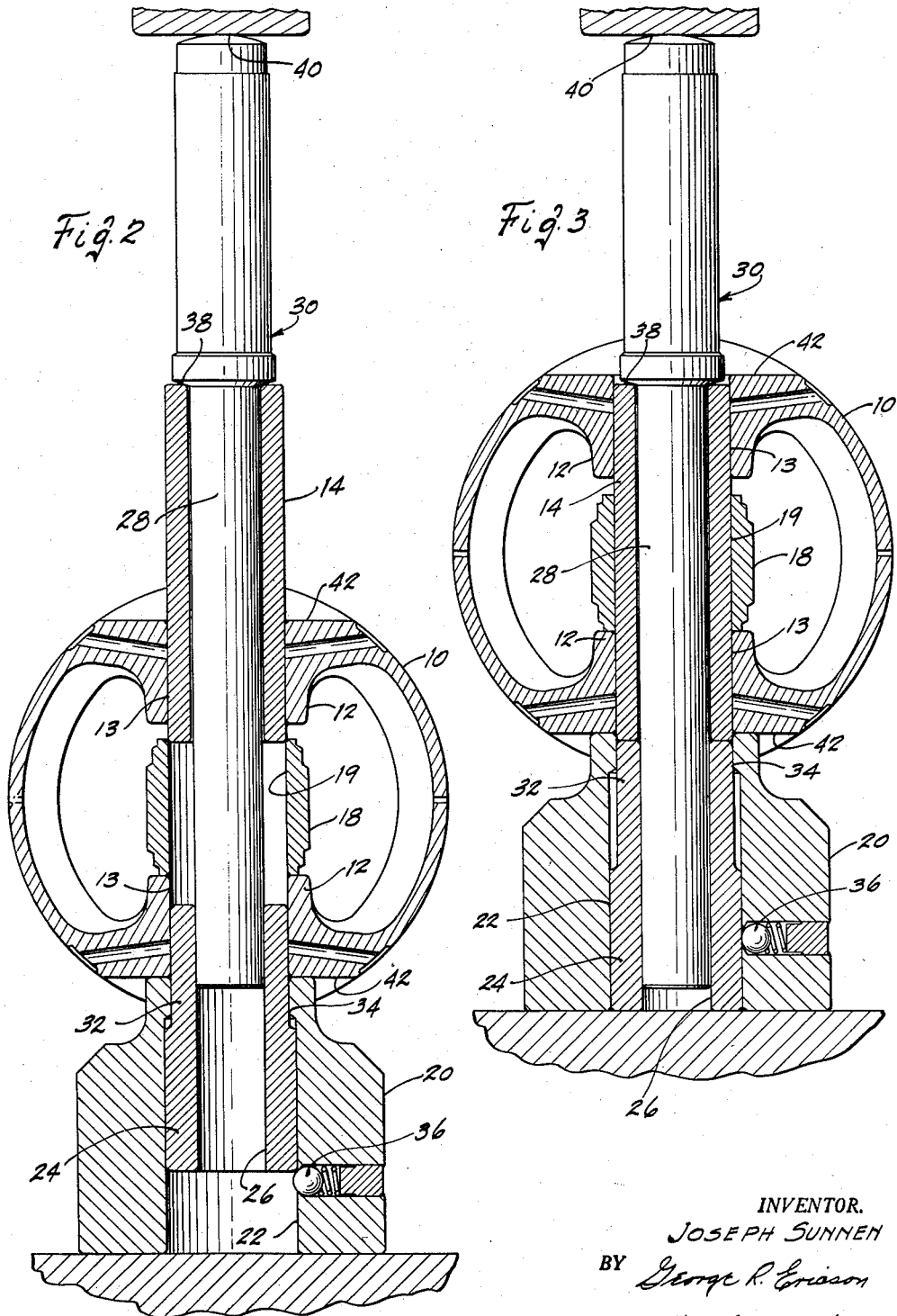
INVENTOR.
JOSEPH SUNNEN
BY George R. Ericson
HIS ATTORNEY United States Patent Office 2,887,768
Patented May 26, 1959

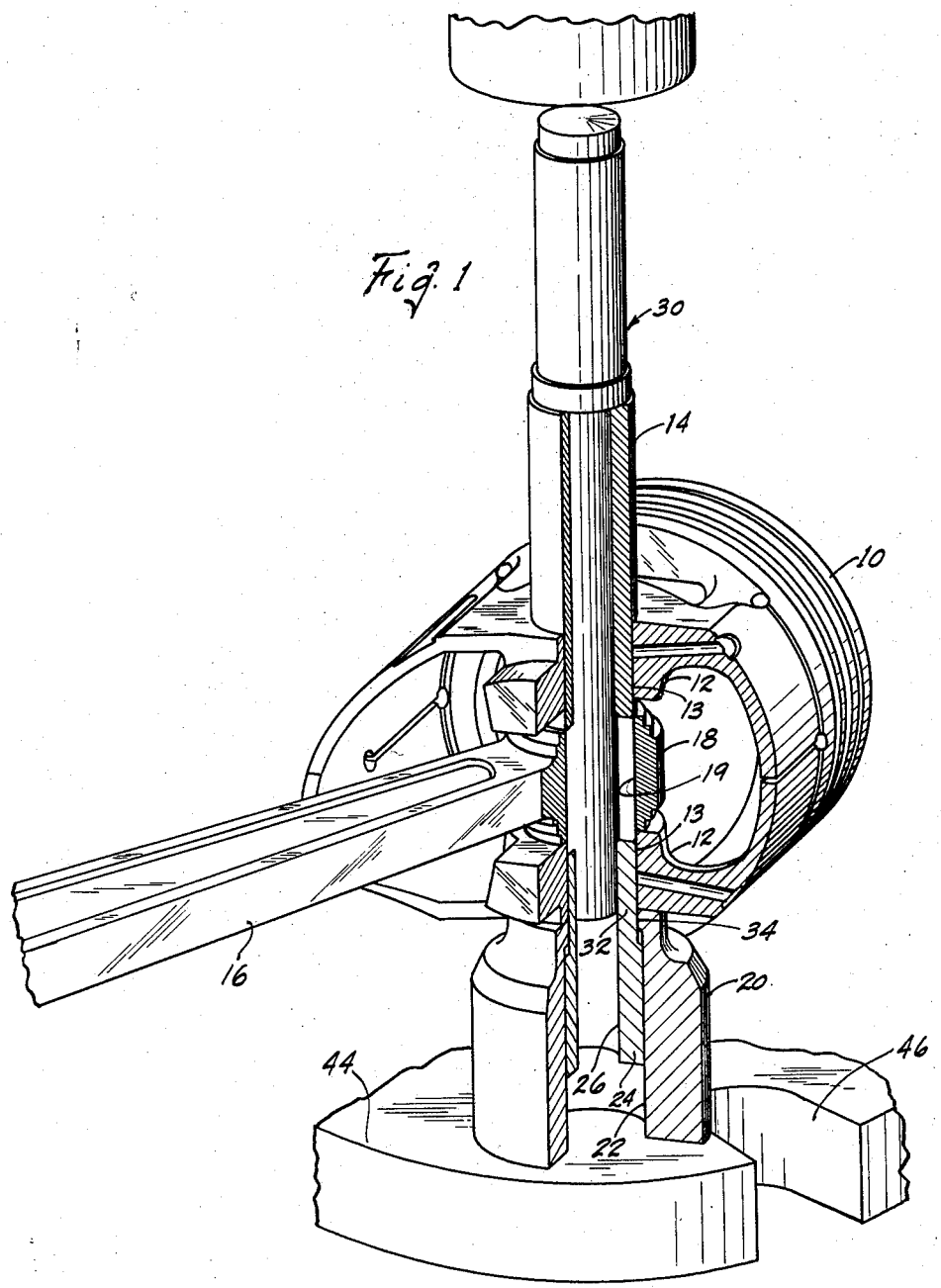

2,887,768
AUTOMOTIVE WRIST PIN TOOL
Joseph Sunnen, Clayton, Mo.
Application August 31, 1955, Serial No. 531,737
3 Claims. (Cl. 29—283)

This invention relates to apparatus for the assembly and removal of hollow wrist pins in automotive piston and connecting rod assemblies wherein the wrist pin is press-fitted into the connecting rod and projects equally from both sides thereof for journalling at its ends in the piston.

An object of the invention is to provide an automotive wrist pin tool having means for positioning the piston, for applying an axial force uniformly to an end of the hollow wrist pin, and for maintaining the axial alignment of the wrist pin with its piston journals as it is pressed into position in the connecting rod.

A further object is to provide means for press fitting the wrist pin in the connecting rod so that it projects equally from both sides of the connecting rod.

A further object is to provide means for positioning the piston of an automotive piston and connecting rod assembly, for applying an axial force uniformly to an end of the hollow wrist pin, and for maintaining alignment of the wrist pin with its piston journals as force is applied to remove the wrist pin from the connecting rod.

These and further objects and advantages will appear from the following description when read in connection with the accompanying drawings.

In the drawings:

Fig. 1 is a partially sectionalized, perspective view showing the tool in use in assembling a wrist pin in a piston and connecting rod;

Fig. 2 is a cross-sectional view showing the tool in its operative position when entering the wrist pin into the connecting rod; and Fig. 3 is a cross-sectional view showing the tool in its operative position when the wrist pin has been completely assembled in the piston and connecting rod.

Referring to the several figures of the drawings in more detail, an automotive piston is indicated at 10 having a pair of spaced bosses 12 which have axially aligned bores 13 for journalling the ends of a hollow wrist pin 14. A connecting rod is indicated at 16 having an end boss 18 with a bore 19 therethrough which receives the wrist pin 14 in tight press-fit relationship. The length of the connecting rod boss 18 is made somewhat less than the distance between the piston bosses 12, as indicated, to afford adequate clearance between these members, and the ends of the wrist pin 14 are slip fitted in the piston bores 13, whereby the free movement of the connecting rod boss 18 back and forth between the interior faces of journal bosses 12 is permitted.

The tool, according to a preferred form of the invention, comprises an anvil member 20 having a bore therethrough. The lower portion 22 of this bore receives a guide bushing 24 in slip fit relationship, and the bushing 24 has a bore 26 therethrough which slidably receives the lower reduced portion 28 of a drive pin member generally indicated at 30.

Guide bushing 24 has an upper reduced diameter portion 32 which slidably fits into an upper reduced diameter portion 34 of the anvil bore and the upward sliding movement of the guide bushing 24 in the anvil bore 22 is thereby limited. Mounted in the wall of the anvil and projecting into the anvil bore 22 is a spring-pressed detent ball 36 which yieldably restrains the downward return movement of the guide bushing 24 once it has been pushed upward beyond the ball, as in Fig. 2. The drive pin 30 has a tapered shoulder 38 formed at the upper end of its lower reduced portion 28, and the upper end of the drive pin is rounded at 40 so as to make a central point contact with the end of a press arbor, or the like, through which axial force is applied to the pin.

In operation, when assembling a wrist pin in a piston and connecting rod, the anvil 20 is placed on the table of an arbor press with its guide bushing 24 in an upwardly extended position, as indicated in Figs. 1 and 2, wherein it is releasably retained by the detent ball 36. When in this position a substantial portion of the reduced upper end 32 of the bushing projects upwardly beyond the upper face of the anvil. The piston is then placed on the anvil with the guide bushing portion 32 entering the lower wrist pin bore 13. It is to be understood that the diameter of the upper reduced portion 32 of the guide bushing is such that it slidably fits the wrist pin bore in the piston, whereby the piston wrist pin bores are positioned in axial alignment with the bore 26 of the guide bushing. It is to be also understood that the upper end of the anvil 20 is square with relation to its bore and that automotive pistons are conventionally provided with opposed flat surfaces 42 perpendicular to the wrist pin bores 13.

With the piston in this position, the wrist pin 14 is slipped on the lower reduced portion 28 of the drive pin 30. The lower drive pin portion 28 is made slightly smaller in diameter than the internal diameter of the hollow wrist pin so that it fits freely therein. The connecting rod end boss 18 is then placed against the internal face of the lower piston boss 12 with its bore 19 in alignment with the wrist pin bores 13, as indicated in Fig. 2. The drive pin 30, with the wrist pin thereon, is then entered through the upper wrist pin bore 13, and the lower end of the drive pin portion 28 is entered into the bore 26 of guide bushing 24. The connecting rod is then carefully positioned so that entry of the wrist pin may be started. Conventionally, the ends of the wrist pins and the ends of the connecting rod bores 19 are chamfered to facilitate the alignment of the wrist pin with the connecting rod bore.

With the connecting rod held in position, a downward pressure is then applied to the drive pin 30 in any suitable manner, as through a press arbor in engagement with the upper, rounded end of the pin. As the downward pressure is applied, the wrist pin 14 and drive pin 30 are held in axial alignment with the wrist pin bores 13 by reason of the entry of the guide bushing portion 32 into the lower wrist pin bore 13 and by the entry of the lower end of the drive pin into the guide bushing bore 26. When the wrist pin has been pressed through the connecting rod bore, it enters the lower wrist pin bore 13 and engages the upper end of guide bushing 24, and as it is pressed downward further, it moves the guide bushing downward until the bushing 24 bottoms on the press table flush with the lower end of the anvil, as indicated in Fig. 3.

The guide bushing 24 is made slightly shorter than the length of anvil 20 in which it slides so that, when the bushing 24 bottoms on the table, the wrist pin will project into the upper anvil bore 34 an amount equal to one-half the total end clearance of the connecting rod boss 18 with respect to the spacing of the internal faces of piston bosses 12, as indicated in Fig. 3. When the bushing 24 bottoms, the wrist pin 14 is therefore, press-fitted into the connecting rod boss 18 with equal end portions projecting from the boss. The tapered shoulder 38 on the drive pin 30 centers the free-fitting, lower portion 28 of the drive pin in the hollow wrist pin so that equal pressure is applied to the upper, annular end face of the pin.

If it is desired to remove a wrist pin from a piston and connecting rod assembly, the anvil 20 is placed over a hole or slot 46 in a press table. The assembly is then placed on the anvil with the connecting rod boss 18 pressed against the interior face of lower piston boss 12 and with the lower end of the wrist pin projecting slightly into the anvil bore 34, as in Fig. 3. The drive pin 30 is then inserted and pressure is applied to its upper end forcing the wrist pin from the connecting rod, whereupon it passes with the guide bushing through the hole or slot in the press table. It will be seen that, as pressure is applied to the upper end of the drive pin to force the wrist pin downward, the wrist pin is guided in the anvil bore 34, and the drive pin 30 is centered at its upper end in the wrist pin and guided at its lower end in the bushing bore 26, and, therefore, in the anvil, for a substantial portion of the movement required to eject the pin.

The foregoing description is intended to be illustrative and not limiting, the scope of the invention being set forth in the appended claims.

I claim:

1. A tool for the removal or insertion of hollow wrist pins in automotive piston and connecting rod assemblies wherein the wrist pin is press-fitted into the end of the connecting rod and projects therefrom at both ends for journalling in wrist pin bores in opposite walls of the piston, said tool comprising an anvil having upper and lower parallel faces and a vertical bore therethrough perpendicular to said faces and of such diameter as to receive the wrist pin to be removed or inserted, a guide bushing slidably received in said anvil bore, said bushing having an internal diameter which is smaller than the internal diameter of a hollow wrist pin to be inserted and having an upper portion of such external diameter as to be slidably received in one of the wrist pin bores in the piston, means for frictionally holding said bushing in a position in said anvil bore wherein said upper portion projects exteriorly above the upper face of the anvil, thereby to be received in one of the wrist pin bores of a piston when it is placed on the anvil, a drive pin having an enlarged head portion at one end for engaging the end of a wrist pin and a main body portion of such diameter and length as to pass freely through the hollow wrist pin to be inserted and be slidably received in said guide bushing at its other end, and said drive pin having a tapered shoulder joining said head portion and said main body portion for engaging the interior edge at one end of the hollow wrist pin, thereby to center the drive pin in the wrist pin at that end.

2. An automotive wrist pin tool for inserting or removing a hollow wrist pin in an automotive piston and connecting rod assembly wherein the wrist pin is press-fitted into the end of the connecting rod and projects equally from opposite sides thereof for journalling in wrist pin bores which extend through internally projecting bosses in opposite walls of the piston, and wherein the dimension between the internal faces of the piston bosses is such as to provide substantial clearance between the sides of the connecting rod end and the piston bosses, said tool comprising an anvil having upper and lower parallel faces and a vertical bore therethrough perpendicular to said faces and of such diameter as to receive the wrist pin to be removed or inserted, a guide bushing slidably fitted in said anvil bore, said guide bushing having an internal diameter which is smaller than the internal diameter of the hollow wrist pin to be inserted and having an upper portion of such external diameter as to be slidably received in one of the wrist pin bores in the piston, means for releasably holding said bushing in an upwardly extended position in said anvil bore wherein a portion thereof projects above the upper face of said anvil, thereby to serve as a pilot for locating a piston placed on the anvil, a drive pin having an enlarged head portion at one end for engaging the end of a wrist pin and a main body portion of such diameter and length as to pass freely through the hollow wrist pin and extend at one end into said bushing in sliding fit relationship therewith when said bushing is in its upwardly extended position and entered into one of the piston bores and when the wrist pin to be inserted has been entered into the other piston bore, and said guide bushing being shorter than the distance between the upper and lower faces of the anvil by an amount equal to one-half the total clearance between the sides of the connecting rod end and the piston bosses.

3. A tool for removing or inserting a hollow wrist pin in an automotive piston and connecting rod assembly wherein the wrist pin is press-fitted at its intermediate portion in the end of the connecting rod and has equally extending end portions journalled in bored bosses in the walls of the piston, and wherein end clearance is provided between the sides of the connecting rod end and the interior faces of the journal bosses so that when the connecting rod is moved against the interior face of one boss, the wrist pin projects from the piston, said tool comprising an anvil having upper and lower parallel faces and having a vertical bore therein perpendicular to said faces and of such diameter as to receive the projecting end of a wrist pin to be removed, thereby to locate the piston when it is placed on the anvil when removing a wrist pin, a guide bushing slidably fitted in said anvil bore and having an upper external diameter portion to slidably fit the wrist pin bores in the piston, means for frictionally positioning said guide bushing in said anvil bore whereby it may be frictionally positioned with its upper portion extending above the upper surface of said anvil so as to enter the bore of a piston placed on the anvil, thereby to locate the piston when inserting a wrist pin, said bushing being shorter than the length of said anvil bore by an amount equal to one-half the total end clearance between the connecting rod and the internal faces of the piston bosses thereby to limit the insertion of the wrist pin in the connecting rod, said guide bushing having an internal diameter which is less than the internal diameter of the hollow wrist pin to be inserted, a drive pin having an enlarged head portion at one end for engaging one end of the wrist pin and a main body portion of such diameter and length as to pass freely through a hollow wrist pin to be inserted and extend in sliding fit relationship at its other end into said bushing, and said drive pin having a tapered shoulder joining said head portion and main body portion for engaging the interior edge of the hollow wrist pin at one end thereby to center the drive pin in the wrist pin at that end.

References Cited in the file of this patent

UNITED STATES PATENTS

| | | |
|---|---|---|
| 1,589,633 | Dunton et al. | June 22, 1926 |
| 1,679,408 | Davis et al. | Aug. 7, 1928 |
| 1,825,873 | Kulp et al. | Oct. 6, 1931 |
| 1,981,925 | Russell et al. | Nov. 27, 1935 |
| 2,215,134 | Rehnberg | Sept. 17, 1940 |
| 2,330,572 | Frey et al. | Sept. 28, 1943 |
| 2,680,903 | Potter | June 15, 1954 |